United States Patent [19]

Bishop

[11] Patent Number: 5,379,043

[45] Date of Patent: Jan. 3, 1995

[54] REPLY-FREQUENCY INTERFERENCE/JAMMING DETECTOR

[75] Inventor: Walton B. Bishop, Oxon Hill, Md.

[73] Assignee: The United States of America as represented by the Secretary of the Navy, Washington, D.C.

[21] Appl. No.: 617,470

[22] Filed: Sep. 26, 1975

[51] Int. Cl.6 .......................... G01S 13/78; G01S 1/36
[52] U.S. Cl. ........................................ 342/45; 342/17; 342/159
[58] Field of Search ............. 343/6.5 R, 6.5 LC, 18 E; 342/17, 45, 159

[56] References Cited

U.S. PATENT DOCUMENTS 3,058,104 10/1962 Garfinkel et al. ............... 343/6.5 R
3,349,402 10/1967 Foster ............................... 343/6.5 R
3,803,604 4/1974 Case ............................... 343/6.5 LC Primary Examiner—Stephen C. Buczinski
Attorney, Agent, or Firm—Thomas E. McDonnell

[57] ABSTRACT

Received IFF reply-frequency signals are examined to determine whether they are being interfered with by enemy sources, and indication of the extent of detected interference is provided.

The number of correct replies received from selected range bins surrounding and including the center one in which a target leading edge is first declared is counted and compared with the count of the number of friend-accept decisions made based on replies from the selected range bins. The level of interference is then indicated by the ratio between the two counts.

3 Claims, 1 Drawing Sheet

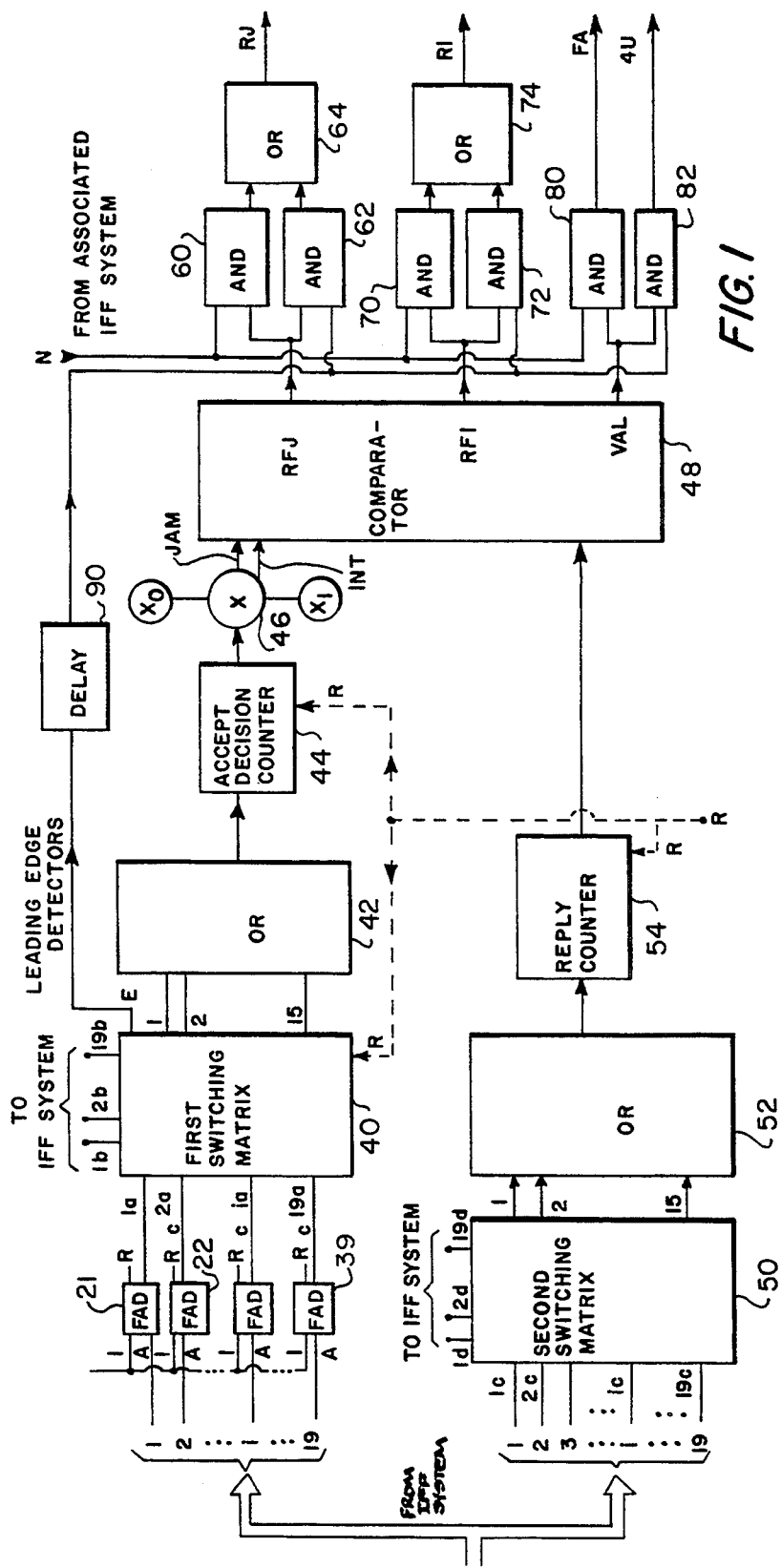
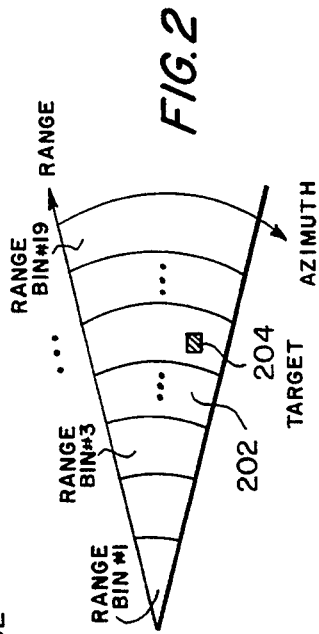

REPLY-FREQUENCY INTERFERENCE/JAMMING DETECTOR

CROSS REFERENCE TO RELATED APPLICATIONS

The present invention is related to copending applications Ser. No. 599,203 of Walton B. Bishop entitled *SEQUENTIAL OBSERVER MULTI-FUNCTIONAL FRIEND ACCEPT DECIDER*, filed Jul. 25, 1975, allowed application Ser. No. 78,317 of Walton B. Bishop entitled *SEMIAUTOMATIC JAM-ACCEPT (SAJAC) DECIDER FOR MODE-4 OF THE IFF MARK XII*, filed Sep. 3, 1970, and copending application of Walton B. Bishop entitled *ANTITARGET SPLITTING BEAM EDGE DETECTOR* filed on even date herewith all of which are assigned to the assignee of the present invention.

BACKGROUND OF THE INVENTION

The present invention relates to Identification-Friend-or Foe system, and more particularly to a means of detecting interference or jamming on the reply frequency of an IFF system. In proper utilization of an IFF system, it is important to determine whether an enemy source is causing interference to the reception of replies to interrogations-interference which may prevent friends from being identified as friends or which may cause other kinds of undesirable misoperation. Furthermore, it is important, if interfering signals are present, to know the extent of disruption caused to the Identification process-particularly whether the interfering signals prevent correct processing of replies, or whether replies can be properly processed in spite of the interference.

The Semiautomatic Jam-Accept (SAJAC) Decider described in my U.S. patent application *SEMI JAM-ACCEPT (SAJAC) DECIDER FOR MODE-4 OF THE IFF MARK III*, U.S. Ser. No. 78,317, filed on Sep. 3, 1970 (presently allowed under secrecy order), was the first Mode 4 Reply Evaluator designed to specifically declare the presence of interfering or jamming signals on the reply frequency when they become serious enough to interfere with the evaluation of replies from friends. The SAJAC device declares jading when extraneous reply-frequency signals are so numerous that the system is jammed. SAJAC does not declare the presence of interfering signals if they are not severe enough to jam the system, even though they may be easily detected as enemy-produced signals.

SUMMARY OF THE INVENTION

The present invention detects the presence of interference on an IFF system reply-frequency, and determines and indicates the extent of interference with IFF system reply-signal processing that any detected interference signals may be causing.

The detection and determination of effect of interfering signals is accomplished by counting the number of correct interrogation replies received from selected range bins surrounding and including the center range bin in which the target's leading edge is first declared, and comparing this count with a count of the number of friend-accept decisions made based on replies from the selected range bins. The ratio between these two counts is then indicative of the level of interference being experienced by the associated IFF system.

It is therefore an object of the present invention to determine when an IFF system is being subjected to interference on its reply frequency;

It is a further object of the present invention to determine the extent of interference being experienced by an IFF system on its reply frequency;

It is another object of the present invention to indicate the extent of interference being experienced by an IFF system on its reply frequency;

Other objects, advantages and novel features of the invention will become apparent from the following detailed description of the invention when considered in conjunction with the accompanying drawings wherein:

DESCRIPTION OF THE DRAWINGS

FIG. 1 depicts a schematic block diagram of a preferred embodiment of the present invention.

FIG. 2 is an illustration of a pie-shaped, range-azimuth scan sector of an IFF system antenna showing typical range-bin positions.

DETAILED DESCRIPTION OF THE PREFERRED EMBODIMENT

Turning now to FIG. 1, a set of input terminals 1–19 for receiving correct-reply indication signals from an associated IFF system are coupled to corresponding "digital" input terminals "A" of a corresponding set of Friend-Accept Deciders (FAD's) 21–39. Each FAD device 21–39 has a digital "0" input terminal denoted as "I", which is connected to a device input terminal I. Also, each FAD device 21–39 has an output terminal denoted as C. These FAD's 21–39 are described in my copending application entitled "*Sequential Observer Multifunctional Friend-Accept Decider*", Ser. No. 599,203, filed in the U.S. on Jul. 25, 1975, which is hereby incorporated by reference. It should be noted that terminals A, I, and C of FAD devices 21–39 utilized in this described embodiment of the present invention correspond respectively to terminals DS(D4), I, and C of the multifunctional decider previously cited.

The output from each FAD device 21–39 is connected to a corresponding input terminal 1a–19a of a switching matrix 40. This switching matrix 40 is of conventional nature and is similar in design to that utilized and described in the previously cited "SAJAC" application, which is hereby incorporated by reference. Switching matrix 40 has a set of control terminals 1b–19b, each corresponding to and controlling passage to a respective output terminal of a signal applied to its like numbered input terminal. Each control terminal 1b–19b is connected to the output of a corresponding "leading edge detector" (such as described in the copending application entitled *ANTITARGET SPLITTING BEAM EDGE DETECTOR* previously cited and hereby incorporated by reference). Switching matrix 40 has a set of fifteen output terminals connected to the input of an OR device 42. Switching matrix 40 also has another output terminal denoted as E.

The output of OR 42 is coupled to the input terminal of accept-decision counter (A-counter) 44. The output of counter 44 is coupled to a first input terminal of a multiplier device 46. Multiplier 46 has two "weighting value" input terminals, one connected to a first source of value $X_o$, and the second connected to a source of value $X_1$. A first output terminal of multiplier 46 is denoted as JAM and is connected to a first input of a comparator device 48. A second multiplier output terminal denoted as INT is connected to a second input of comparator 48.

Each input terminal 1–19 is also connected to a corresponding input terminal of a set of input terminals 1c–19c of a second switching matrix 50. Switching matrix is of similar design and construction to switching matrix 40. Switching matrix 50 has a set of control terminals 1d–19d, each controlling passage to a respective output terminal of a signal applied to its like numbered switching matrix input terminal. Each control terminal 1d–19d is connected to the same leading edge detector output as its like numbered control terminal 1c–19c of switching matrix 40. This switching matrix 50 has a set of fifteen output terminals coupled to an OR device 52.

The output of OR 52 is coupled to the input terminal of a reply counter (R-counter) 54. In turn, the output of R-counter 54 is coupled to a third input terminal of comparator 48. Comparator 48 has three output terminals denoted RFJ, RFI, and VAL.

Output terminal RFJ is connected to an input of each of two AND devices 60, 62. The outputs of these AND devices 60, 62 are coupled to an OR device 64, whose output forms a device output terminal denoted as RJ.

Output terminal RFI is coupled to an input of each of two AND devices 70, 72, whose outputs are connected to the input of an OR device 74. The output of OR 74 forms a device output terminal denoted as RI.

The third output terminal, VAL, is coupled to an input of each of two AND devices 80, 82. The output of AND 80 forms a device output terminal denoted as FA, while the output of AND 82 forms a device output terminal denoted as 4U.

The output terminal E of switching matrix 40 is coupled through a delay means 90 to a second input terminal of AND 62, AND 72, and AND 80.

A device input terminal, denoted as N, is adapted to receive a signal from the associated IFF system, and is coupled to a second input terminal of AND 60, AND 70, and AND 80.

A device reset terminal R is connected to a reset terminal R of each FAD device 21–39 (connections omitted on the figure for clarity), accept-decision counter 44 and reply counter 54.

Description of Operation

A pie-shaped sector 200 in FIG. 2 illustrates a geographical range-azimuth scanning sector covered by an IFF system antenna of a typical associated IFF system. The sector 200 is divided into a number of concentric range bins 202. The location of a target 204 present in any one of the range bins 202 is localized to the range resolution of the bin. Signals from sources (e.g. targets or interfering transmitters) corresponding to these range bins are "sorted" to indicate the corresponding range in the same well known manner as are signals in radar systems, i.e., by dividing the reply-interval time-period into segments corresponding to the signal travel time from different ranges (of course taking into account the known transponder delay-time), and "extracting" the portion of the signals being received during a particular time segment and applying it to a corresponding device input terminal 1–19.

In operation, the range bin signals are separately processed in two processing channels whose outputs are compared to form a final decision respecting the target identification and level of IFF interference.

Both switching matrices 40, 50 operate so that only fifteen input signals which are centered about the one whose corresponding control terminal first received a leading edge declaration from the associated IFF system are allowed to pass to their corresponding outputs. The range bins corresponding to these selected (passed) signals are termed the selected range bins. The passed output signals from matrix 50 are combined in OR 52 so that the total number of these signals (sequentially occurring in time) may be counted by reply counter 54. Thus, reply counter 54 counts the number of decoded replies from the selected range bins. This counting starts as soon as a leading edge declaration signal is received at a control terminal of switching matrices 40, 50. The number $R_o$ of correct replies counted is fed continuously to comparator 48 as it accumulates.

Each FAD device 21–39 receives a corresponding input signal from the set of range gated and decoded (i.e., correct reply signal indication signals), input singals applied to terminals 1–19. Fifteen output signals (corresponding to the selected range bins) are selected for passage to OR 42 from the FAD 21–39 outputs by matrix 40. The passed FAD output signals are combined by OR 42 and applied to accept decision counter 44 so that the total number, $A_o$, of accept decisions made by the selected FAD outputs will be counted. The number $A_o$ is then multiplied by a predetermined weighting factor $X_o$ to form the quantity $A_oX_o$, whose value is represented by a sequence of binary signals at output terminal JAM. Also $A_o$ is multiplied by $X_1$ to form $A_oX_1$ at output terminal INT. In general, $X_1$ is chosen to be a value less than $X_o$.

Comparator 48 thus receives three input signal values: $R_o$, $A_oX_o$, and $A_oX_1$, and produces three output signals: RFJ, RFI, and VAL, depending upon the relative values of its input signals. These output signals are utilized by logic devices 60–82 to determine a proper interference level indication at the device outputs RJ, RI, FA and 4U.

Description of Operation

A leading edge declaration signal (applied to a control terminal of the set 1b–19b of switching matrices 40, 50) indicates that replies being received in the corresponding range bin have become strong enough for evaluation or replies to begin. The evaluation process of the present invention will then determine if the reply-frequency signals coming from range bins adjacent to the selected center range bin contain interfering signals (i.e., enemy jamming or spoofing signals).

If the described embodiment of the present invention determines that many interfering signals are present (and thus it is likely that an erroneous friend-accept decision has been made by the associated IFF system), then it will prevent a friend-accept indication from being displayed and will provide instead a "mode 4" reply-frequency jamming indication signal RJ. On the other hand, if the associated IFF system can eliminate or "read through" interfering signals which may be present (accomplishing this by amplitude-discriminating circuit, for example), then this described embodiment will not declare jamming, but will indicate the presence of extraneous interference signals by a "reply frequency interference signal" RI. This latter RI output signal occurs only if there are definitely more reply frequency signals than could have been produced by friends. If the extraneous signals are not severe enough (or there are not enough of them) to produce jamming, and yet no accept decision is made concerning the target in the range bin of interest (i.e., the selected center range bin), then a "mode 4 unknown" signal 4U a friend-accept signal will be produced if there has been no friend-accept signal from the selected center channel FAD device (e.g. 30) when an input signal is received at terminal N and if there is no output on comparator 48 output terminal RFJ. An FA device output signal occurs whenever selected center channel FAD produces an output (delayed by device 90), provided there is no comparator 48 output RFJ.

Matrix switch 40 is operated so as to provide collection of output signals immediately after the declaration of a target's leading edge, and remains open until either a friend-accept signal is produced by the FAD that produced the leading edge signal, or until the associated IFF system indicates, by the signal on device input terminal N, that no-friend-accept decision can be made at this time.

Now, for illustrative purposes I have assumed that the leading edge is first declared upon replies associated with the tenth range bin. Since the leading edge was declared for the 10th bin, both matrix switches 40 and 50 select signal channels 3 through 17 passage. The reply counter (R-counter) 22 then simply counts the number of replies decoded from corresponding range bins 3 through 17 (fed to it through OR 52). The counting starts as soon as a leading edge declaration signal is received at a control terminal of switching matrices 40. This 50 count is fed continuously to comparator 48 as it accumulates.

The input terminal A of each FAD 21-39 now receives a digital "one" if the IFF system receives a correct reply, while input terminal I receives a "zero" if a correct reply is not received.

The total number, $A_o$, of Friend-Accept decisions made concerning replies from range bins 3 through 17 is counted (after the signals have been combined in OR 42) by Accept counter 44. The count $A_o$ accumulated by Accept-counter 44 is continuously fed to Friend-Accept count multiplier 46, which multiplies $A_o$ by predetermined fixed numbers $X_o$ for output JAM and by $X_1$ for output INT. The number $X_o$ is selected so that the resulting product $A_oX_o$ will always be a total number, $A_o$, greater than the number of accepted replies that the number $A_o$ of friends at range of interest to the equipment can be expected to produce, but less than the number of replies in the same range gates required to cause the selected FAD's to accept enemies who try to appear as friends by transmitting more than one reply to each interrogation received.

The average number $\bar{Q}$ of replies expected from a friend depend upon the total number of replies allowed for each Friend-Accept decision as well as the statistical decision function employed, and the "round reliability" achieved. Friends at the ranges of interest will not be able to produce more than $\bar{Q}A_o$ replies; so if the number of replies accumulated by Reply Counter 54 is as high as say $3\bar{Q}_oA$, then at least some of these replies must have come from enemy sources. It should be noted that a few may be produced by unsynchronized replies (i.e. "fruit") from other friendly transponders. Consequently, if the count reached by Reply counter 54 is greater than $3\bar{Q}A_o$, then mode 4 Reply-frequency Jamming (RJ) should be declared and any mode 4 friend-accept decisions made by associated IFF subsystems should be rejected. If the accumulated R-counter 54 count is less than $3\bar{Q}A_o$, but still considerable greater then $\bar{Q}A_o$ (e.g. $2\bar{Q}A_o$), then mode 4 reply-frequency interference (RI) should be declared.

As long as the accumulated count is less than the number required to prevent valid Friend-Accept Decisions from being made by the Associated IFF system, the Friend-Accept decision made by the Associated IFF system should be allowed to go to output "FA".

The Comparator 48 thus has the following functions to perform: it constantly compares the count $R_o$ of replies received (as made by reply counter 54) with the product-output signals from the output terminals of multiplier 46. Thus, for a choice of weighting factors $X_o = 2$, and $X_1 = 3$. The interference signal value multiplier output terminal INT may be only $2\bar{Q}A_o$, while the jamming signal value multiplier output terminal jam must be a least $3\bar{Q}A_o$ (for the illustrative example under discussion).

If $R_o < 3\bar{Q}A_o$, then comparator 48 will provide an output signal on its terminal VAL, indicating that valid Friend-Accept decisions can be made.

But if $2\bar{Q}A_o < R_o < 3\bar{Q}A_o$, then comparator 48 will provide an output voltage on its output terminal RFI, indicating that mode 4 Reply-frequency Interference is present along with an output voltage on output terminal VAL to indicate that an enemy's attempts to interfere with the IFF system have been detected, but that they are not successfully interfering with the IFF identification process.

On the other hand if $3\bar{Q}A_o < R_o$, then comparator 48 will provide an output signal only on its output terminal RFJ, in dictating that mode 4 Reply-frequency jamming has occurred.

The output signals from comparator 58 output terminals RFJ, RFI, and VAL are combined by logic devices with a received signal at device input terminal N from the associated IFF system. This last signal indicates that no accept decision can be made for the target being evaluated.

An output jamming indication signal AJ indicating that the reply signals are being jammed to such as extent so as to interfere with their processing, is generated if $R_o > 3\bar{Q}A_o$ whenever the selected center channel corresponding FAD (e.g. #10 in the above illustration and its FAD 30) produces an accept signal or a signal is received on input terminal N indicating that no accept decision can be made at this time.

An output interference indication signal RI, indicating that extraneous reply signals are being received, but that these signals are not interfering with the processing of reply signals, is produced when $2\bar{Q}A_o < R_o < 3\bar{Q}A_o$ and whether the selected channel FAD produces a friend-accept signal or a 4U signal is produced.

An output Mode 4 friend-accept indication signal, indicating that the target under evaluation is a friend, and that this determination can confidently be made at the level of interference to received replies which the system is experiencing, is made when the selected channel FAD generates a friend-accept signal and this indication if followed by occurrence of $R_o < 3\bar{Q}A_o$.

An output 4U signal can only appear when jamming is not present. This 4U signal indicating that the target under evaluation cannot be accepted as a friend is generated when $R_o < 3\bar{Q}A_o$ and a signal is received on device input terminal N (indicating that no accept decision can be made at this time).

What is claimed and desired to be secured by Letters Patent of the U.S. is:

1. An evaluation and decision device for evaluating signals received by an IFF interrogator site reply receiver from a selected range bin to determine whether signals from the selected range bin are produced by a friendly or unknown source and whether reply frequency interference exists, originating in the vicinity of the selected range bin or associated adjacent range bins, said reply-receiver system providing means for separately receiving IFF replies on said reply-frequency from all range bins, reply-counting means for counting the number of replies received from respective range bins, means for determining whether a received reply comes from a friend and thereupon making an accepted-signal decision, and friend-accept signal means for counting the number of accepted-signal decisions made and providing a friend-accept signal when a sufficient number of accepted-signal decisions for a predetermined number of interrogations is counted; said evaluation and decision system comprising:

means coupled to said friend-accept signal means, for producing a decision signal upon the occurrence of a friend-accept signal corresponding to said center selected channel; and means coupled to said reply counting means and to said friend-accept signal means for comparing said counted number of replies $R_o$ with said counted number of friend-accept decisions $A_o$, and for producing a) a jamming-threshold-achieved indication signal RFJ when said count $R_o$ is greater than said count $A_o$ multiplied by a predetermined jamming threshold, number $X_1$; b) an interference-threshold-achieved indication signal RFI when said number $R_o$ is less than $X_1 A_o$ but is greater than said count $A_o$ multiplied by a predetermined interference threshold number $X_o$; and c) a lowest interference-threshold- achieved indication signal VAL when said number $R_o$ is equal to or less then $X_1 A_o$;

said signal RFJ indicating that said interference is at a level which significantly interferes with the IFF system operation, said signal RFI indicating that said interference is at a level which does not interfere in a significant way with the IFF system operation, and said signal VAL indicating that said interference is of a negligible value.

2. The evaluation and decision device of claim 1 which further includes:

logic means, coupled to the output of said comparing means, to the output of said decision-signal-producing means, and to said IFF system, for receiving said comparing-means output signals RFJ, RFI and VAL, said decision signal, and said friend-accept signal; and for producing a) a reply-frequency jamming indication signal RJ upon the occurrence of said jamming-threshold-achieved indication signal; b) a reply-frequency interference indication signal RI upon the occurrence of said interference-threshold-achieved indication signal; c) a friend -accept- signal FA upon the occurrence of said lowest interference-threshold-achieved indication signal and said decision signal; and d) an unknown target signal 4 U upon the occurrence of said lowest interference-threshold-achieved indication signal and said friend-accept signal.

3. A method for detecting and indicating the level of reply frequency interference to an IFF interrogator site reply receiver from the vicinity of a particular selected center range bin by utilizing information regarding correct replies from selected range bin in the vicinity of said selected center range bin and friend-accept decisions corresponding to each said selected range bin comprising the steps of:

counting the number of correct replies received from said selected range bins to produce a number $R_o$;

counting the number of friend-accept decisions corresponding to said selected range bins to produce a number $A_o$;

generating a jamming threshold achieved first signal if $R_o$ is greater than $A_o$ times a predetermined a jamming threshold number $X_1$;

generating an interference threshold achieved second signal if $R_o$ is less than $A_o X_1$, but is greater than $A_o$ times a predetermined interference threshold number $X_o$;

generating a lowest interference threshold achieved signal if $R_o$ is less than or equal to $A_o X_1$.

* * * * *